(12) United States Patent
Mebus

(10) Patent No.: US 6,290,018 B1
(45) Date of Patent: Sep. 18, 2001

(54) MOUNTING DEVICE FOR A PEDAL

(75) Inventor: Norbert Mebus, Kösching (DE)

(73) Assignee: LuK Lamellen und Kupplungsbau GmbH, Buhl/Baden (DE)

(*) Notice: Subject to any disclaimer, the term of this patent is extended or adjusted under 35 U.S.C. 154(b) by 0 days.

(21) Appl. No.: 09/456,203

(22) Filed: Dec. 7, 1999

(30) Foreign Application Priority Data

Dec. 7, 1998 (DE) .............................. 198 56 322

(51) Int. Cl.[7] .................................................. B60T 7/22
(52) U.S. Cl. ............................................ 180/274; 180/202
(58) Field of Search .................................. 180/274, 275, 180/271, 282; 74/512; 280/784, 748; 296/189

(56) References Cited

U.S. PATENT DOCUMENTS

| 4,426,890 | * | 1/1984 | Hansen | 74/478 |
| 4,637,741 | * | 1/1987 | Gillet | 74/512 |
| 5,531,135 | * | 7/1996 | Dolla | 74/512 |
| 5,771,752 | * | 6/1998 | Cicotte | 74/512 |
| 5,778,732 | * | 7/1998 | Patzelt et al. | 74/512 |
| 5,848,558 | * | 12/1998 | Isono et al. | 74/512 |
| 5,848,662 | * | 12/1998 | Sakaue | 180/274 |
| 6,055,883 | * | 5/2000 | Kato | 74/512 |
| 6,070,488 | * | 6/2000 | Yabusaki et al. | 74/512 |
| 6,112,616 | * | 9/2000 | Schonlau et al. | 74/512 |
| 6,142,036 | * | 11/2000 | Mizuma et al. | 74/512 |

* cited by examiner

Primary Examiner—Paul N. Dickson
Assistant Examiner—Deanna L. Draper
(74) Attorney, Agent, or Firm—Darby & Darby

(57) ABSTRACT

A mounting device for a pedal is installed on a fixed wall of a vehicle in an arrangement where a brace holding the pivotally mounted pedal is firmly attached to the wall and the connection between the brace and the pedal is self-releasing in the case of a collision.

26 Claims, 1 Drawing Sheet

MOUNTING DEVICE FOR A PEDAL

BACKGROUND OF THE INVENTION

The invention relates to a mounting device, particularly for a vehicle, for mounting at least one pedal on a fixed wall of the vehicle in an arrangement where at least one brace is firmly connected to the wall. The brace has an opening for a bolt to pass through, and at least one pedal is pivotally connected to the bolt.

Mounting devices of this kind are used for mounting brake-, clutch-, and/or accelerator pedals in motor vehicles. In the case of a collision of the vehicle against an obstacle, it is possible for the pedals to be pushed up so that they stand out into the passenger space, because associated parts as well as the fixed walls of the vehicle can be deformed by the collision. To prevent or reduce the problem of the pedals being pushed into the passenger space, special suspension devices for the pedals have been proposed, for example in DE-OS 43 05 290, DE-OS 39 04 616, DE-OS 43 44 386, and EP-PS 659 615. In all of these publications, the proposed solution for the problem of the pedals being pushed up is that the pedals are swiveled away from the space occupied by the driver's feet, for example by providing an appropriately calculated mode of deformation or by means of hinges. A release for freeing up the pedals to move perpendicularly to their pivotal mounting axle has not been considered in these arrangements.

OBJECT OF THE INVENTION

It is therefore the object of the present invention to provide a mounting device that releases the pedals so that they are free to move in any direction in the case of a collision.

SUMMARY OF THE INVENTION

The stated object of the invention is met by a mounting device for mounting at least one pedal on a fixed wall of a vehicle in an arrangement where at least one brace holding at least one pivotally mounted pedal is firmly attached to the wall and the connection between the brace and the pedal is self-releasing in the case of a collision. A mounting device of this kind completely releases the pedal so that it dangles freely in the passenger space and only hangs together with the motion-transmitting elements for the associated pedal-operated devices. A pedal of this kind also has the advantage that it will not get stuck in the direction perpendicular to the pedal mount. An advantageous design can comprise openings in the brace and the pedal in which a bolt is held through an arrangement where, in the case of a collision, the bolt is automatically pushed out of the openings, for example in the axial direction of the bolt.

In an embodiment of the invention, the bolt can be held in the opening of the brace through an arrangement where the bolt is axially movable against the axial force of an energy-storing element. The energy-storing element can be prestressed in its active direction between the bolt and a fixed part of the vehicle, the bolt being secured axially by means of a safety-release device that is self-releasing in the case of a collision of the vehicle against an obstacle.

In a further mounting device in accordance with the invention, the bolt can be held in the opening through an arrangement where the bolt is axially movable and, in the case of a collision of the vehicle against an obstacle, an axially acting explosive charge, e.g., a pyrolytic element of the known kind that is used in belt tensioners, is ignited and expels the bolt from the opening in the axial direction.

It is advantageous if, in the case of a collision of the vehicle against an obstacle, the release of the bolt is activated by a signal that is generated by a collision sensor. The signal can be an electrical signal that is evaluated, processed, and subsequently transmitted to the actuator device for removing the bolt from the opening. A suitable actuator device can, for example, be provided in the form of an electrically controlled safety-release device that holds the energy-storing element in a prestressed condition and releases the energy-storing element after the signal has been transmitted, so that the stored kinetic energy is used to expel the bolt. Furthermore, the electrical signal can also be used to ignite the explosive charge.

In accordance with the inventive concept, the force of the energy-storing element or the explosive charge can act on one side against a fixed part of the vehicle and on the other side against a radially wider portion of the bolt, whereby the bolt is expelled axially from the opening of the brace through the energy released by the energy-storing device (e.g., a helix spring) or the gas pressure of the explosive charge. It can be advantageous if the energy-storing device or the explosive charge is on its outer radius surrounded by a sleeve-shaped enclosure formed advantageously on the brace by providing the latter with an axially extending portion of an appropriate shape. It can further be of advantage to provide a coaxial guide channel along the entire expulsion path of the bolt, so that the bolt is guided along the path of its expulsion. The guide channel allows, e.g., the explosive charge to better deploy its driving force and expel the bolt more effectively, because the gas pressure can be concentrated on the radially wider portion. If an energy-storing device is used, the safety-release device for the prestressed energy-storing device can be arranged so that it acts between the guide channel and the bolt.

For better stability of the mounting device, it can be advantageous to provide at least two braces that have coaxial openings, with the pedal being pivotally mounted between the braces by means of an appropriate opening in the pedal for the bolt to pass through. It is advantageous if the opening of the pedal as well as the opening of one brace is expanded into an axially oriented tube so as to improve stability in the axial direction. The tube-shaped extensions of the pedal and/or of the brace can be press-formed, or they can be configured as tubular profile sections that are inserted into the openings and firmly connected to the opening, e.g., by welding and/or press-fitting. It can further be advantageous to provide a bushing between the opening and the bolt so that the bushing is rotatable in relation to the opening but can be attached non-rotatably to the bolt. It can also be advantageous if the bolt is held non-rotatably in the brace and/or if the bolt is held non-rotatably in the area of the energy-storing device or the explosive charge. This can be accomplished through an appropriate profile of the bolt, e.g., a four-cornered profile.

As an advantageous modular extension of the mounting device with the two braces and a pedal axially between them, a further pedal can be added in an arrangement where an additional brace is placed adjacent to one of the two braces with the further pedal being accommodated in between. A yet further expansion of this arrangement by one or more pedals can likewise be advantageous, particularly if a parking brake pedal is to be accommodated in addition to brake, clutch, and/or accelerator pedals.

The novel features that are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWING

The drawing, consisting of FIGS. 1 and 2, serves to explain the invention in closer detail, both of the FIGS. 1 and 2 representing sectional views of embodiments of mounting devices in accordance with the invention.

DETAILED DESCRIPTION OF THE INVENTION

Figure 1:
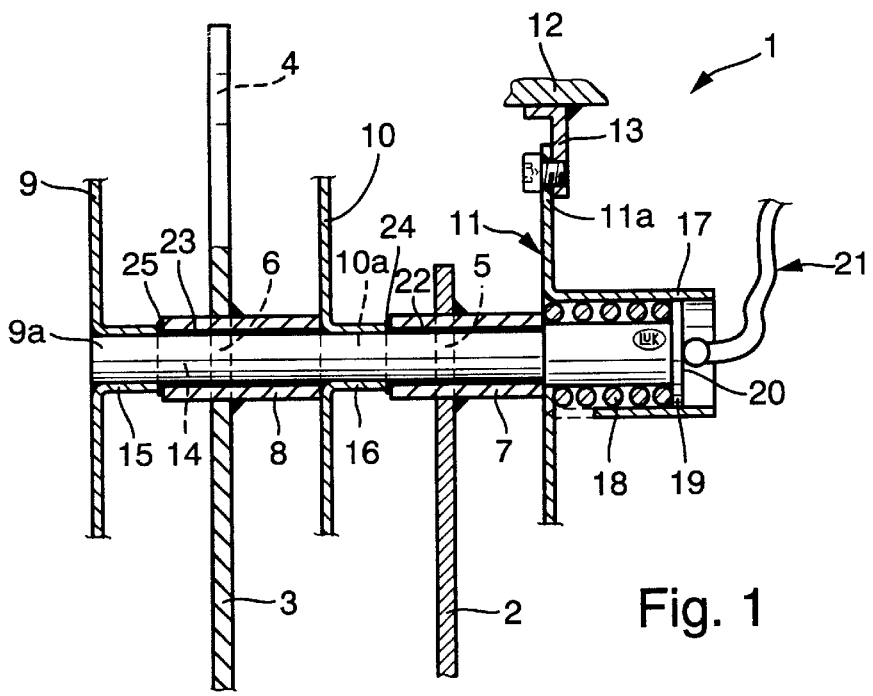

FIG. 1 illustrates a mounting device 1 for two pedals 2, 3 that are only partially shown. In the illustrated arrangement, pedal 2 can be a brake pedal, and pedal 3 can be a clutch pedal with a connector element 4 for a force-transmitting device to a clutch-release bearing. The pedals 2 and 3 have openings 5 and 6, respectively, at their pivoting centers. Tubular profile sections 7 and 8 are inserted in the openings 5 and 6 and fastened to the pedals 2 and 3 by, e.g., welding or press-fitting.

The pedals 2 and 3 are connected to the vehicle and are bracketed axially between the braces 9, 10, 11. As an example of how the braces are fastened to the vehicle wall 12, brace 11 is attached (e.g., riveted or screwed) to an angle bracket 13 which, in turn, is attached (e.g., welded) to the vehicle wall 12. Axially directed extensions 15, 16 are formed on the braces 9, 10 to serve as axial guides for the bolt 14 that holds the pedals 2 and 3. The brace 11 has an appropriately shaped axial extension 17, so that the energy-storing device in the form of a helical compression spring can be accommodated in the cylindrical gap between the extension 17 and the bolt 14. In order to form a shoulder, the bolt 14 has a radially stepped-up portion 19 at the far end from the pedals, so that the helical compression spring 18 can be axially prestressed between the rim of the opening 11a of the brace 11 and the stepped-up portion 19. An electrically controllable safety-release device 20 serves to secure the axially prestressed helical compression spring 18. The safety-release device secures a connective engagement between the axial extension 17 of the brace 11 and the stepped-up portion 19. A release of the engagement is triggered through the electrical connection 21 so that the stored energy of the helical compression spring 18 expels the bolt 14 in the axial direction whereby the pedals 2, 3 are set loose. The electrical leads 21 can be connected directly to a collision sensor (not shown) or to a control unit in which a collision-sensor signal is processed.

To make the pedals run more smoothly on the bolt 14, bushings 22 and 23 may be inserted radially between bolt 14 and the pedal holders 7 and 8, respectively. Preferably, the bushings 22 and 23 have collars 24, 25 that are turned radially outwards at the axial contact areas between the bushings 22, 23 and the extensions 15, 16 of the braces 9, 10. It is advantageous if the bolt 14 has a cross-sectional profile that prevents the bolt from sharing the movement of the pedals 2, 3 in relation to the braces 9, 10, 11. The profile can have a form-locking shape in relation to the openings 9a, 10a of the braces 9, 10. The bushings 22, 23, likewise, have form-fitting seats on the bolt, while the pedal holders 7, 8 can rotate freely on the bushings 22, 23.

Figure 2:
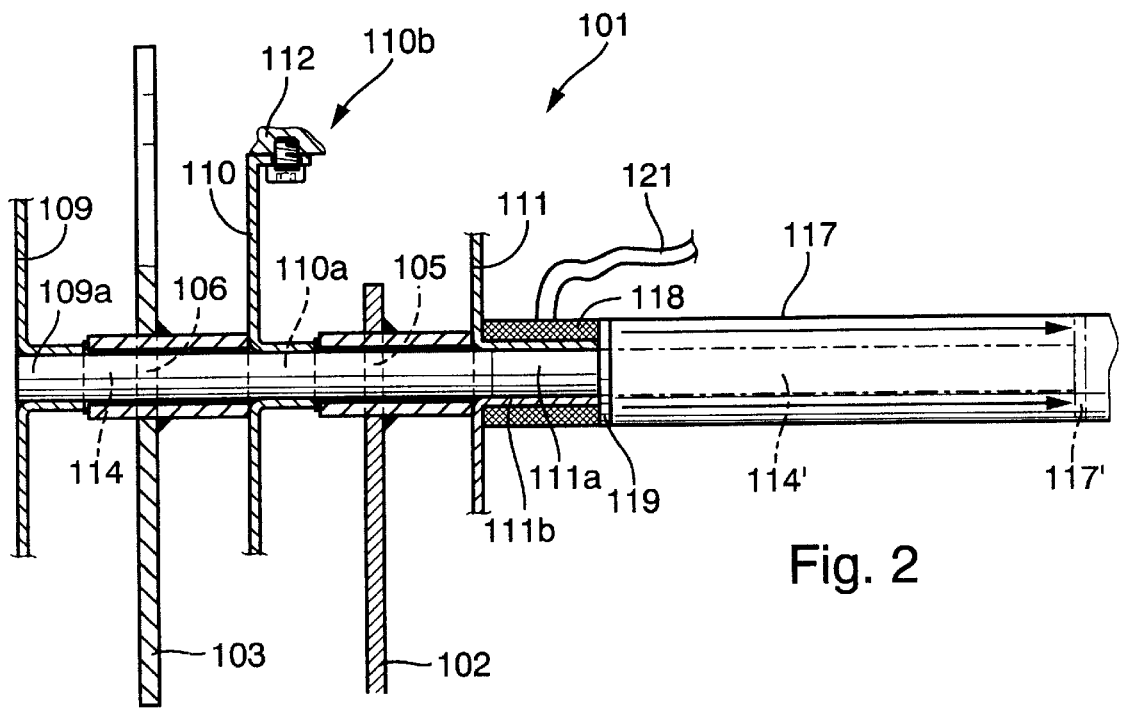

The mounting device for the pedals 102, 103 shown in the sectional view of FIG. 2 is essentially identical with the arrangement of FIG. 1 but, in place of the prestressed energy-storing element 18, the device of FIG. 2 comprises an explosive charge 118 for expelling the bolt 114 axially from the openings 105, 106 of the pedals 102, 103 and from the openings 109a, 110a, and 11a of the braces 109, 110, 111.

To concentrate the gas pressure of the ignited explosive charge 118 on the end surface 119 of the bolt 114, the explosive charge is surrounded on the outside by a tubular channel 117 of the same axial length as the bolt, so that the bolt is guided inside the tubular channel along the entire expulsion path. The broken lines show the bolt 114' with the end surface 119' in the expelled position after the explosive charge 118 has been detonated. The electrical leads 121 conduct the electrical ignition signal from a collision sensor (not shown) or from a control unit (not shown) to the explosive charge 118 that is accommodated in the cylindrical space between the tubular channel 117 and an extension 111b of the brace 111.

As an alternative solution in place of the fastening attachment shown in FIG. 1, a fastening arrangement 110b for the brace 110 is illustrated as an example, wherein an axially oriented portion is shaped at the end of the brace 110 and fastened (e.g., screwed or riveted) to the wall 112. It is to be understood that the other braces, for example 109 and/or 111, can also be installed in the same manner.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A mounting device for mounting at least one pedal on a fixed wall of a vehicle with at least one brace firmly attached to the wall, the brace having an opening for receiving a bolt that holds the pedal through a pivotal connection, comprising the improvement that the connection between the bolt and the pedal is self-releasing in the case of a collision of the vehicle, the bolt in relation to the opening is axially movable and, in case of a collision of the vehicle against an obstacle, the bolt is expelled in an axial direction from the opening by an axial expulsion force of an energy-storing element, the energy storing element being prestressed between the bolt and a fixed part of the vehicle, and the bolt being secured against axial movement by means of a safety-release device.

2. The mounting device according to claim 1, wherein the bolt in relation to the opening is axially movable and, in case of a collision of the vehicle against an obstacle, the bolt is expelled in an axial direction from the opening by an explosive charge generating an axial expulsion force between the bolt and a fixed part of the vehicle.

3. The mounting device of claim 2, wherein the explosive charge is ignited by a signal from a collision sensor.

4. The mounting device according to claim 1, wherein the expulsion of the bolt from the opening is triggered by a signal that is generated by a collision sensor.

5. The mounting device of claim 4, wherein the signal is an electrical signal.

6. The mounting device of claim 4, wherein the signal is evaluated by a control unit.

7. The mounting device of claim 1, wherein the release of the safety-release device is triggered by a signal from a collision sensor.

8. The mounting device according to claim 1, wherein the fixed part of the vehicle is the at least one brace.

9. The mounting device according to claim 1, wherein the bolt comprises a radially wider portion at a far end from the opening, the radially wider portion forming a shoulder to receive the axial expulsion force.

10. The mounting device according to claim 9, comprising a coaxial guide channel extending away from the at least one brace to guide the bolt during an expulsion phase in case of a collision.

11. The mounting device according to claim 10, wherein the coaxial guide channel is configured as a sleeve conforming to the radially wider portion of the bolt.

12. The mounting device of claim 1, wherein the energy-storing device comprises at least one helical compression spring.

13. The mounting device of claim 1, wherein the at least one brace comprises a guide surrounding the energy-storing device lengthwise.

14. The mounting device of claim 13, wherein the safety-release device acts between the bolt and the guide.

15. The mounting device according to claim 1, comprising at least two braces with coaxial openings where the at least one pedal is pivotally held between the braces by means of a pivotal opening and the bolt traverses the coaxial and pivotal openings.

16. The mounting device according to claim 15, wherein at least one of the coaxial and pivotal openings has a tube-shaped, axially oriented extension.

17. The mounting device according to claim 16, wherein the tube-shaped extension is made by press-forming.

18. The mounting device according to claim 16, wherein the tube-shaped extension comprises a tubular profile section solidly connected to the opening.

19. The mounting device according to claim 16, comprising a bushing located radially between the opening and the bolt.

20. The mounting device according to claim 15, comprising in an axially extended configuration at least one further pedal and at least one further brace so that each of the pedals is held axially between two braces.

21. The mounting device according to claim 1, wherein the bolt is held non-rotatably in the brace.

22. The mounting device according to claim 1, wherein the bolt has a four-cornered cross-sectional profile.

23. The mounting device according to claim 1, wherein the at least one pedal is of the category consisting of brake, clutch, accelerator, and parking brake pedals.

24. The mounting device according to claim 1, wherein the explusion of the bolt from the opening is triggered by a signal that is generated by a collision sensor.

25. The mounting device according to claim 1, wherein the fixed part of the vehicle is the at least one brace.

26. The mounting device according to claim 1, wherein the at least one pedal is of the category consisting of brake, clutch, accelerator, and parking brake pedals.

* * * * *